United States Patent
Azuma et al.

(10) Patent No.: US 7,379,567 B2
(45) Date of Patent: May 27, 2008

(54) IRIS CODE GENERATION METHOD, INDIVIDUAL AUTHENTICATION METHOD, IRIS CODE ENTRY DEVICE, INDIVIDUAL AUTHENTICATION DEVICE, AND INDIVIDUAL CERTIFICATION PROGRAM

(75) Inventors: Takeo Azuma, Kyoto (JP); Kenji Kondo, Kyoto (JP); Masahiro Wakamori, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 362 days.

(21) Appl. No.: 10/544,803

(22) PCT Filed: Jul. 16, 2004

(86) PCT No.: PCT/JP2004/010573

§ 371 (c)(1),
(2), (4) Date: Aug. 4, 2005

(87) PCT Pub. No.: WO2005/008590

PCT Pub. Date: Jan. 27, 2005

(65) Prior Publication Data

US 2006/0120570 A1      Jun. 8, 2006

(30) Foreign Application Priority Data

Jul. 17, 2003    (JP)    ............... 2003-275954

(51) Int. Cl.
*G06K 9/00*    (2006.01)
(52) U.S. Cl. .................................... 382/117
(58) Field of Classification Search ............... 382/117
See application file for complete search history.

(56) References Cited

U.S. PATENT DOCUMENTS

| | | | | |
|---|---|---|---|---|
| 5,291,560 | A * | 3/1994 | Daugman | 382/117 |
| 5,703,958 | A * | 12/1997 | Hara | 382/124 |
| 5,812,697 | A * | 9/1998 | Sakai et al. | 382/186 |
| 5,901,238 | A * | 5/1999 | Matsushita | 382/117 |
| 6,526,160 | B1 * | 2/2003 | Ito | 382/117 |
| 6,606,394 | B1 * | 8/2003 | Park et al. | 382/108 |
| 6,606,397 | B1 * | 8/2003 | Yamamoto | 382/117 |

(Continued)

FOREIGN PATENT DOCUMENTS

| | | |
|---|---|---|
| JP | 8-504979 | 5/1996 |
| JP | 11-4377 A | 1/1999 |
| JP | 2001-319234 A | 11/2001 |
| WO | 94/09446 | 4/1994 |

*Primary Examiner*—Samir A. Ahmed
*Assistant Examiner*—Michael Vanchy, Jr.
(74) *Attorney, Agent, or Firm*—Harness, Dickey & Pierce, PLC

(57) ABSTRACT

A plurality of images that include the same eye is input (S11) and iris regions are extracted therefrom to obtain iris images (S12). After the plural iris images are subjected to transformation from a rectangular coordinate system to a polar coordinate system (S13) and rotational compensation (S14), the images are added together while a weight is attached to a pixel value in each coordinate of the polar coordinate system, to accumulate them as a single iris image (S15). An iris code is generated from the thus obtained single iris image (S16, S17).

24 Claims, 18 Drawing Sheets

U.S. PATENT DOCUMENTS 7,044,602 B2 * 5/2006 Chernyak ................. 351/208
7,155,035 B2 * 12/2006 Kondo et al. ............. 382/117
7,173,743 B2 * 2/2007 Yamazaki ................. 358/483
2001/0026632 A1 * 10/2001 Tamai ....................... 382/116
2002/0118864 A1 * 8/2002 Kondo et al. ............. 382/117
2003/0152252 A1 * 8/2003 Kondo et al. ............. 382/117

* cited by examiner xy rectangular coordinate system iris region rθ polar coordinate system FIG. 17
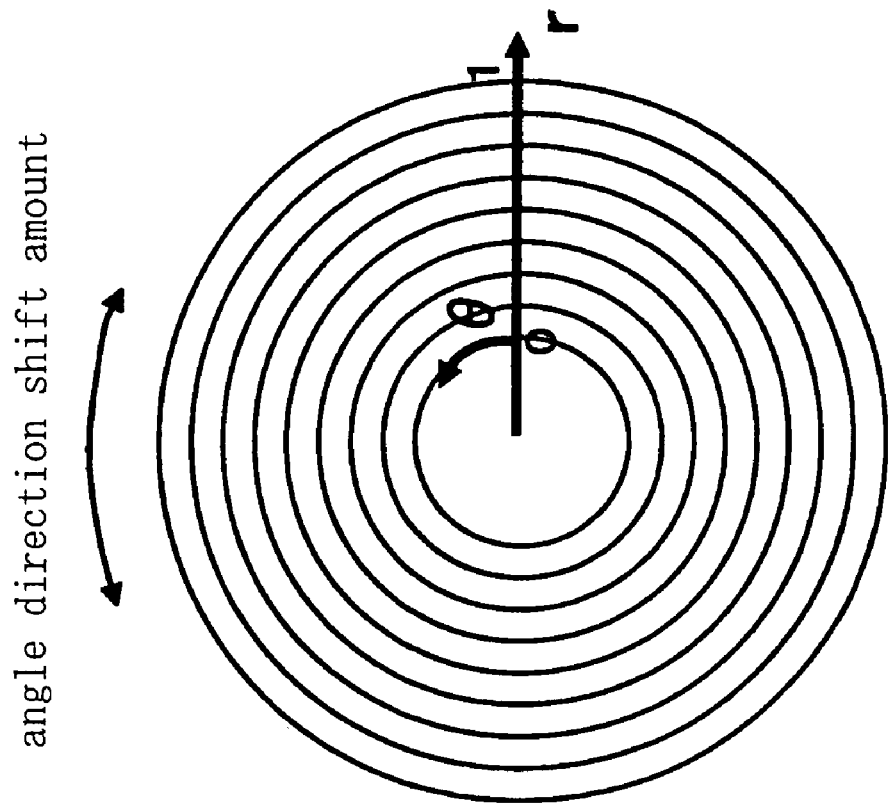
Gabor transformed data
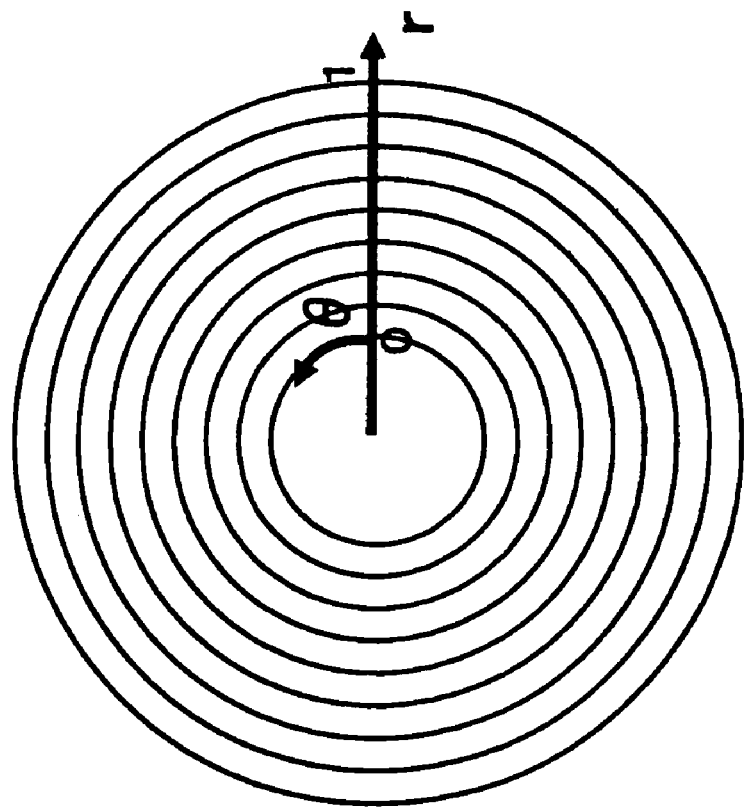
Gabor transformed data (reference)

IRIS CODE GENERATION METHOD, INDIVIDUAL AUTHENTICATION METHOD, IRIS CODE ENTRY DEVICE, INDIVIDUAL AUTHENTICATION DEVICE, AND INDIVIDUAL CERTIFICATION PROGRAM

TECHNICAL FIELD

The present invention relates to a personal authentication technique that uses iris information, which is one of biometric information.

BACKGROUND ART

Various personal authentication methods that use biometric information of an iris, a fingerprint, a face and the like have been proposed. In recent years, a personal authentication technique utilizing iris images has been started to be used for entrance/exit management in a restricted building, bank ATMs (Automated Teller Machines), PC login applications and the like.

Personal authentication utilizing iris images is proposed in Patent Reference 1, for example. In Patent Reference 1, an iris code is generated through the following steps:

1) Obtain an iris image;
2) Detect the pupil perimeter (pupil/iris border) and the iris perimeter (iris/sclera (white portion) border) from the obtained image to extract an iris region;
3) Transform the image of the iris region to a polar coordinate transformed images;
4) Apply multi-scale 2-d Gabor transformation to the polar coordinate transformed image; and
5) Binarize the real part and imaginary part of the Gabor transformed data to generate an iris code.

Then, at the time of registration, an iris code for a registrant is generated through the above steps 1) to 5) and is registered in a registration database. On the other hand, at the time of authentication, an iris code for a person who is to be authenticated is generated through the above steps 1) to 5) and is compared with the iris code in the registration database to determine, based on a difference between the iris codes, whether or not he/she is a person who has been registered in the registration database.

(Patent Reference 1) Published Japanese translation of PCT international publication for patent application No. 8-504979

DISCLOSURE OF INVENTION (Problems to be Solved by the Invention)

In recent years, mobile terminals, such as mobile phones, PDAs and the like, have been rapidly widespread. It is expected that authentication using such mobile terminals (mobile authentication) will be widespread in the future.

In the case of a mobile terminal, a camera incorporated therein has relatively low quality (low resolution) because of cost and size restrictions. In the case where the above-described conventional method is carried out with a low-resolution camera, there is a possibility that sufficient resolution necessary for iris authentication cannot be obtained. Insufficient resolution is often observed particularly in the inner peripheral portion of the iris region. While, random noise is included in an image, and therefore, includes a frequency component ranging from low frequency to high frequency. Noise component would be larger than an image signal (iris pattern) in the high frequency range at insufficient resolution. In this case, an iris code generated becomes different from the actual one.

Accordingly, even if a person who is to be authenticated is a registered person, a difference between the iris code generated at the time of authentication and the iris code generated at the time of registration becomes large. If this difference exceeds a predetermined threshold value, a registered person is not authenticated as he/she is, namely, so-called false rejection (FR) occurs. In other words, the false rejection rate increases because of the performance of the camera.

In view of the above problems, an object of the present invention is to reduce the occurrence of false rejection in personal authentication utilizing iris images even when a low resolution camera is used.

(Means for Achieving the Objective)

For the purpose of achieving the above object, according to the present invention, a plurality of iris images that include the same eye are subjected to coordinate transformation from a rectangular coordinate system to a polar coordinate system and rotational compensation, and then, are added together, while attaching a weight to each pixel value in each coordinate of the polar coordinate system to accumulate them as a single image. Or, after the coordinate transformation, band limitation and rotational compensation are performed, and then, the images are added together while attaching a weight to each data value in each coordinate of the polar coordinate system to accumulate them as a single image. At this time, the weight is set smaller as a distance between the coordinate value of the original rectangular coordinate system corresponding to a coordinate of the polar coordinate system and the coordinate value of a pixel in the vicinity thereof is longer. Or, the weight is set larger as the coordinate value of the original rectangular coordinate system is closer to an integer while the weight is set smaller as the coordinate value thereof is farther from an integer. Then, an iris cord is generated from the thus obtained single iris image or image.

According to the present invention, when the distance between the coordinate value of the original rectangular coordinate system corresponding to a coordinate of the polar coordinate system and the coordinate value of a pixel in the vicinity thereof is long or the coordinate value of the original rectangular coordinate system is far from an integer in the weighted addition of a plurality of iris images or band-limited images, namely, when the reliability of the obtained data is low because of the interpolation, a small weight is attached. On the other hand, when the distance between a coordinate value of the original rectangular coordinate system and the coordinate value of a pixel in the vicinity thereof is small or a coordinate value of the original rectangular coordinate system is close to an integer, namely, when the data reliability is high, a large weight is added. In this association, a single iris or band-limited image of which resolution is higher than that of the original individual iris images and which has a luminance distribution similar to that of the actual iris can be obtained, with a result of remarkable improvement in resolution even in images captured with a low resolution camera. Accordingly, stable iris codes can be generated likewise in a high resolution camera, thereby in reducing the occurrence of false rejection in iris authentication which is caused by a low resolution a camera.

(Effects of the Invention)

According to the present invention, a single iris or band-limited image having a higher resolution than that of the original individual iris images and having a luminance distribution similar to that of the actual iris can be obtained, with a result of remarkable improvement in resolution of images captured with a low resolution camera. Accordingly, stable iris codes can be generated likewise in a high resolution camera, thereby reducing the occurrence of false rejection in iris authentication which is caused by a low resolution of a camera.

BRIEF DESCRIPTION OF THE DRAWINGS

FIG. 17 shows a method for rotationally compensating Gabor transformed data.

BEST MODE FOR CARRYING OUT THE INVENTION

Figure 1:
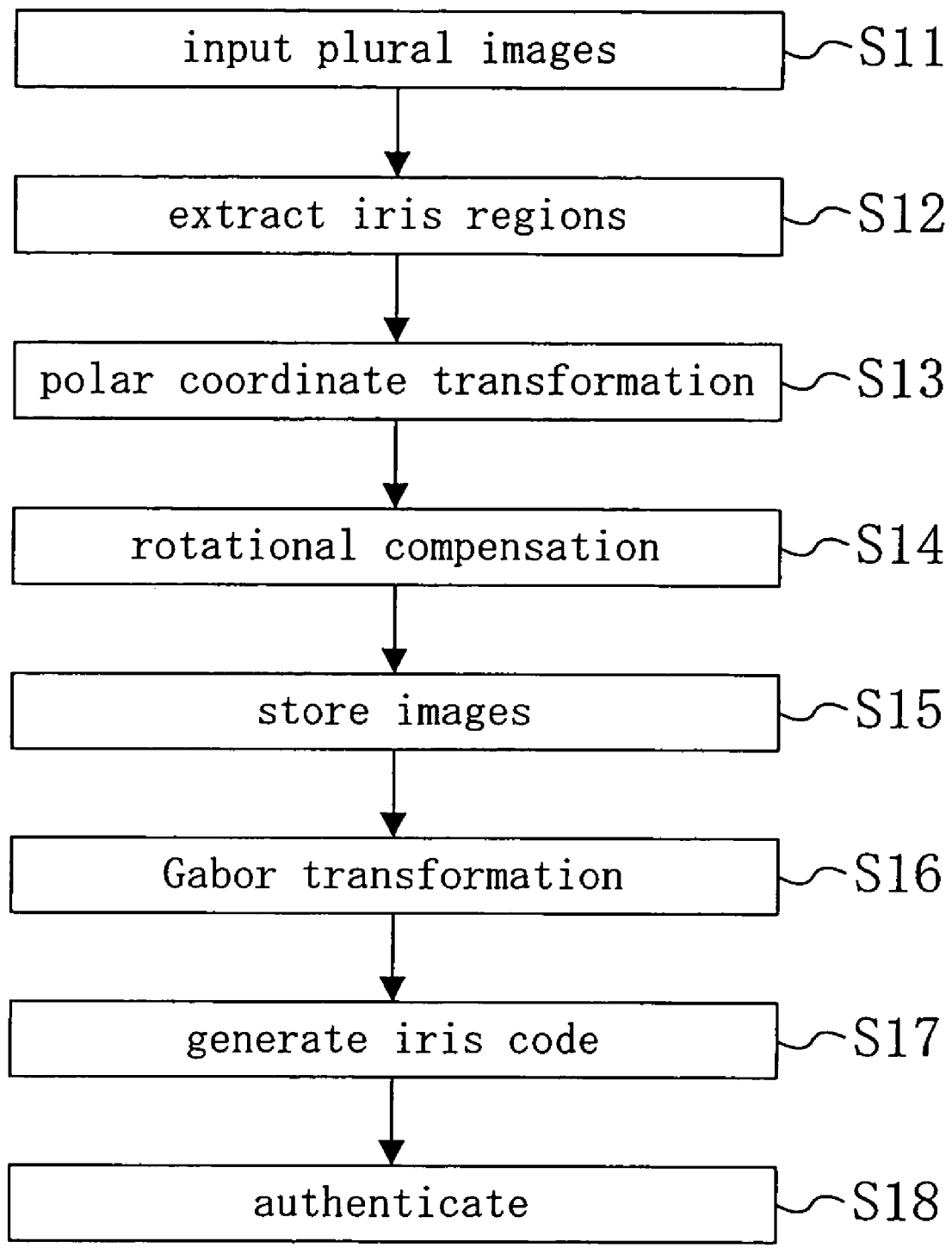
FIG. 1 is a flowchart illustrating an iris authentication method according to the first embodiment of the present invention.

The first aspect of the present invention provides an iris code generation method including the steps of: a step of capturing a plurality of iris images that include a same eye; a step of transforming a coordinate system of each of the iris images from a rectangular coordinate system to a polar coordinate system; a step of performing rotational compensation on each of the coordinate transformed iris images; a step of adding together each of the rotationally compensated iris images, while attaching a weight to each pixel value in each coordinate of the polar coordinate system, to accumulate them as a single iris image; and a step of generating an iris code from the single iris image, wherein in the weighted addition in the accumulation step, the weight is set smaller as a distance between a coordinate value in the original rectangular coordinate system corresponding to a coordinate of the polar coordinate system and a coordinate value of a pixel in the vicinity thereof is larger.

The second aspect of the present invention provides an iris code generation method including the steps of: a step of capturing a plurality of iris images that include a same eye; a step of transforming a coordinate system of each of the iris images from a rectangular coordinate system to a polar coordinate system; a step of performing band limitation on each of the coordinate transformed iris images; a step of performing rotational compensation on the band-limited iris images; a step of adding together each of the rotationally compensated iris images, while attaching a weight to a data value in each coordinate of the polar coordinate system, to accumulate them as a single iris image; and a step of generating an iris code from the single iris image, wherein in the weighted addition in the accumulation step, the weight of a data value of which coordinate value of the original rectangular coordinate system corresponding to a coordinate of the polar coordinate system is close to an integer is set large, while the weight of a data value thereof is far from an integer is set small.

The third aspect of the present invention provides an iris code generation method including the steps of: a step of capturing a plurality of iris images that include a same eye; a step of transforming a coordinate system of each of the iris images from a rectangular coordinate system to a polar coordinate system; a step of performing band limitation on each of the coordinate transformed iris images; a step of performing rotational compensation on the band-limited iris images; a step of adding together each of the rotationally compensated iris images, while attaching a weight to each data value in each coordinate of the polar coordinate system, to accumulate them as a single iris image, and a step of generating an iris code from the single iris image, wherein in the weighted addition in the accumulation step, the weight is set smaller as a distance between a coordinate value of the original rectangular coordinate system corresponding to a coordinate of the polar coordinate system and a coordinate value of a pixel in the vicinity thereof is larger.

The fourth aspect of the present invention provides the iris code generation method of the second or third aspect, wherein the band limitation is performed by Gabor transformation.

The fifth aspect of the present invention provides a personal authentication method including the steps of: a first step of performing authentication by generating an iris code from a single iris image captured for a person who is to be authenticated; and a second step of performing, when the authentication in the first step results in rejection, authentication by generating an iris code from a plurality of iris images captured for the person who is to be authenticated by the iris code generation method of any one of the first to fourth aspects.

The sixth aspect of the present invention provides an personal authentication method using an iris image, including the steps of: at a time of registration, generating an iris code from an iris image; and registering the generated iris code in a database, at a time of authentication, generating an iris code from an iris image; and performing authentication by comparing the thus generated iris code with the iris code registered in the database, wherein at at least one of the time of registration and the time of authentication, iris code generation is performed by the iris code generation method of any one of the first to fourth aspects.

The seventh aspect of the present invention provides an iris code registration device including: a code generation section that generates an iris code by the iris code generation method of any one of the first to fourth aspects; and a registration section that registers in a database an iris code generated by the code generation section.

The eighth aspect of the present invention provides a personal authentication device, including: a code generation section that generates an iris code by the iris code generation method of any one of the first to fourth aspects; and an authentication section that performs authentication by comparing an iris code generated by the code generation section with a registered iris code.

The ninth aspect of the present invention provides a personal authentication program that allows a computer to execute the steps of: a code generation step of generating an iris code by the iris code generation method of any one of the first to fourth aspects; and an authentication step of performing authentication by comparing the iris code with an iris code registered in a database.

The embodiments of the present invention will be described below with reference to the drawings.

First Embodiment

FIG. 1 is a flowchart illustrating a personal authentication method using iris recognition according to the first embodiment of the present invention. In the present embodiment, a person who is to be authenticated performs iris recognition by a mobile phone having an authentication function as shown in FIG. 2.

Figure 2:
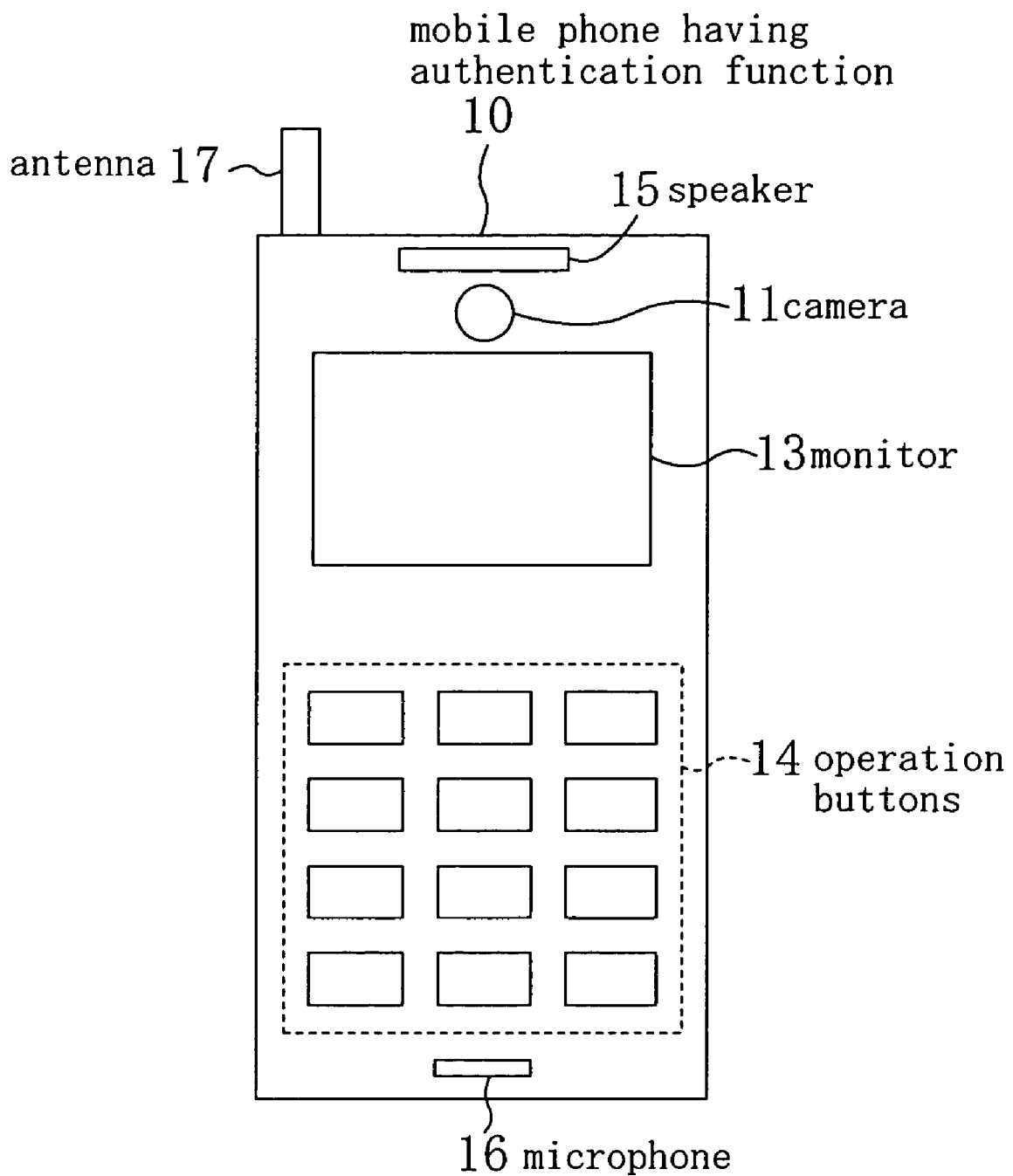
FIG. 2 shows the external appearance of a mobile phone having an authentication function as one example of an iris authentication device according to the present invention.

In the mobile phone 10 having the authentication function in FIG. 2, a camera 11 for capturing an iris image is added to a general mobile phone. In addition to the camera 11, a monitor 13, operation buttons 14, a speaker 15, a microphone 16, an antenna 17 and the like are equipped. The monitor 13 displays an iris image at capturing and the authentication result.

Figure 3:
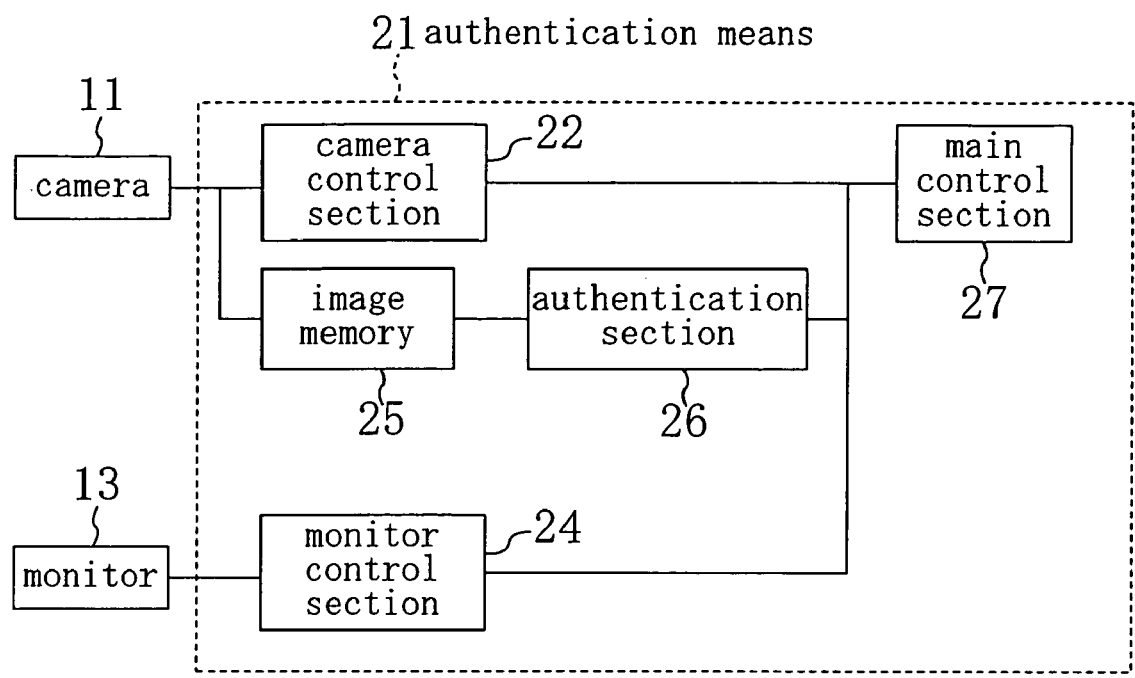
FIG. 3 schematically shows an internal structure of the mobile phone of FIG. 2.

FIG. 3 shows the internal structure of the mobile phone having the authentication function in FIG. 2. In FIG. 3, a camera control section 22 and a monitor control section 24 are connected to a main control section 27 in authentication means 21. The camera control section 22 captures an iris image while controlling the camera 11, and the captured iris image is stored in an image memory 25. An authentication section 26 performs authentication using the iris image stored in the image memory 25. The monitor control section 24 controls a display screen of the monitor 13.

The processing of the personal authentication method according to the present embodiment will be described below by referencing the flowchart of FIG. 1. Steps S11 through S17 constitute an iris code generation method.

First of all, a person who is to be authenticated holds the mobile phone 10 having the authentication function shown in FIG. 2 and captures a plurality (N) of images that includes his/her own eye (S11). In the time of capturing, the person who is to be authenticated holds the mobile phone 10 having the authentication function at a position apart from a predetermined distance from his/her eye (e.g., 20 cm before in the case where the camera 11 has a single focus), and positions the mobile phone 10 so as to allow the entire region of the iris to be included in the field of view and to come into focus while confirming the state where an image that the camera 11 is capturing is displayed in the monitor 13. Then, a capturing button, which is an allotted one of the operation buttons 14, is pressed. This operation is repeated N times. Or, it is possible that a capturing start button is pressed once and N-frame images are obtained successively while capturing a moving image.

The following steps S12 through S18 are performed by the authentication section 26. Herein, the following processes are performed based on the method disclosed in the aforementioned Patent Reference 1.

Figure 4:
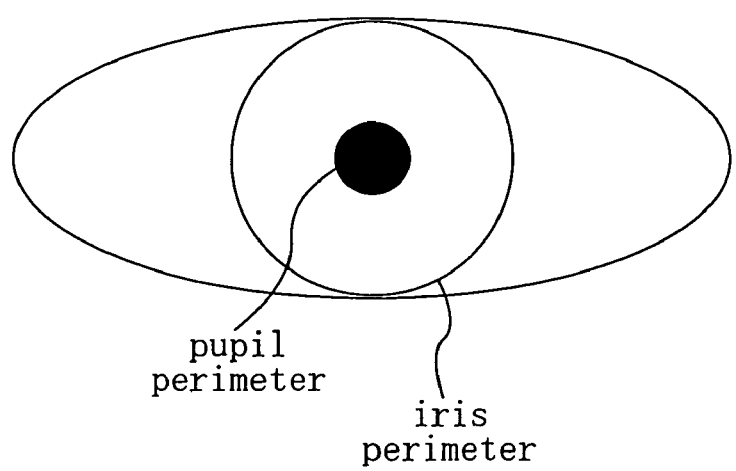
FIG. 4 shows a pupil perimeter and a iris perimeter.
Figure 5:
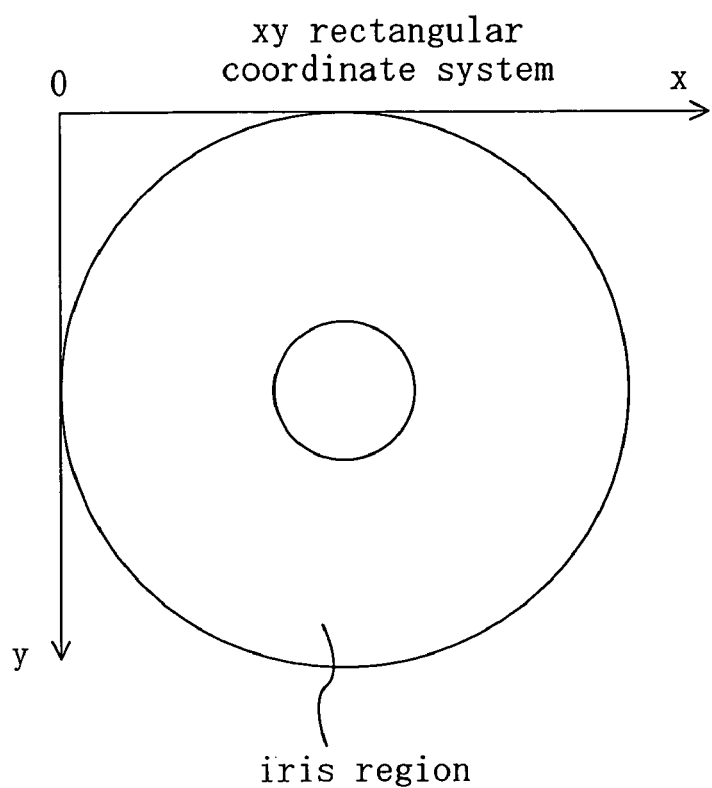
FIG. 5 shows an iris image over a rectangular coordinate system.

First, iris regions are extracted respectively from the N images captured in the step S11 (S12). The process in this step is the same as that in Patent Reference 1. Whereby, a plurality of iris images of the same eye thus captured are obtained. FIG. 4 shows the positions of the iris perimeter and the pupil perimeter, and FIG. 5 shows the region enclosed with the iris perimeter and the pupil perimeter, which is extracted as an iris region, over an xy-coordinate system. At this time, influence of parallel movement of the iris region is absorbed.

Figure 6:
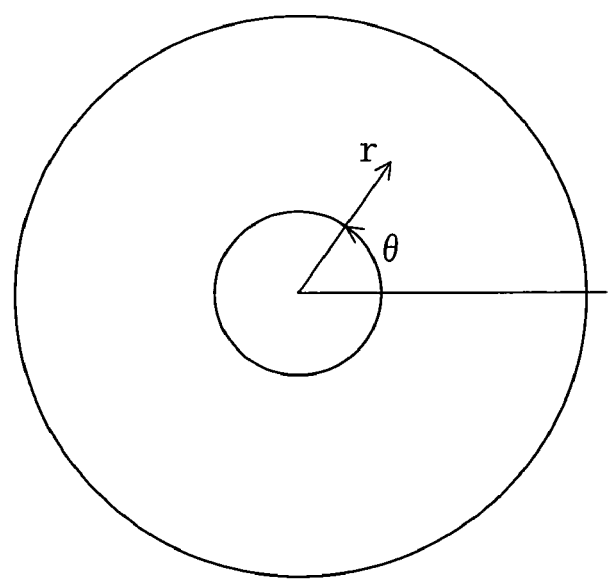
FIG. 6 shows an iris image over a polar coordinate system.

Next, each extracted iris image is polar coordinate transformed, namely, is transformed from the rectangular coordinate system to a polar coordinate system (S13). The process in this step is also the same as in Patent Reference 1. FIG. 6 shows the iris region over an rθ polar coordinate system with the pupil center as a center. A value of a direction of r is set 0 in the pupil perimeter and 1 in the iris perimeter so that a difference in pupil opening and influence of expansion or contraction can be absorbed. Whereby, a plurality of iris images from which the influences of the parallel movement, the expansion or contraction and the difference in pupil opening are removed are generated.

Figure 7:
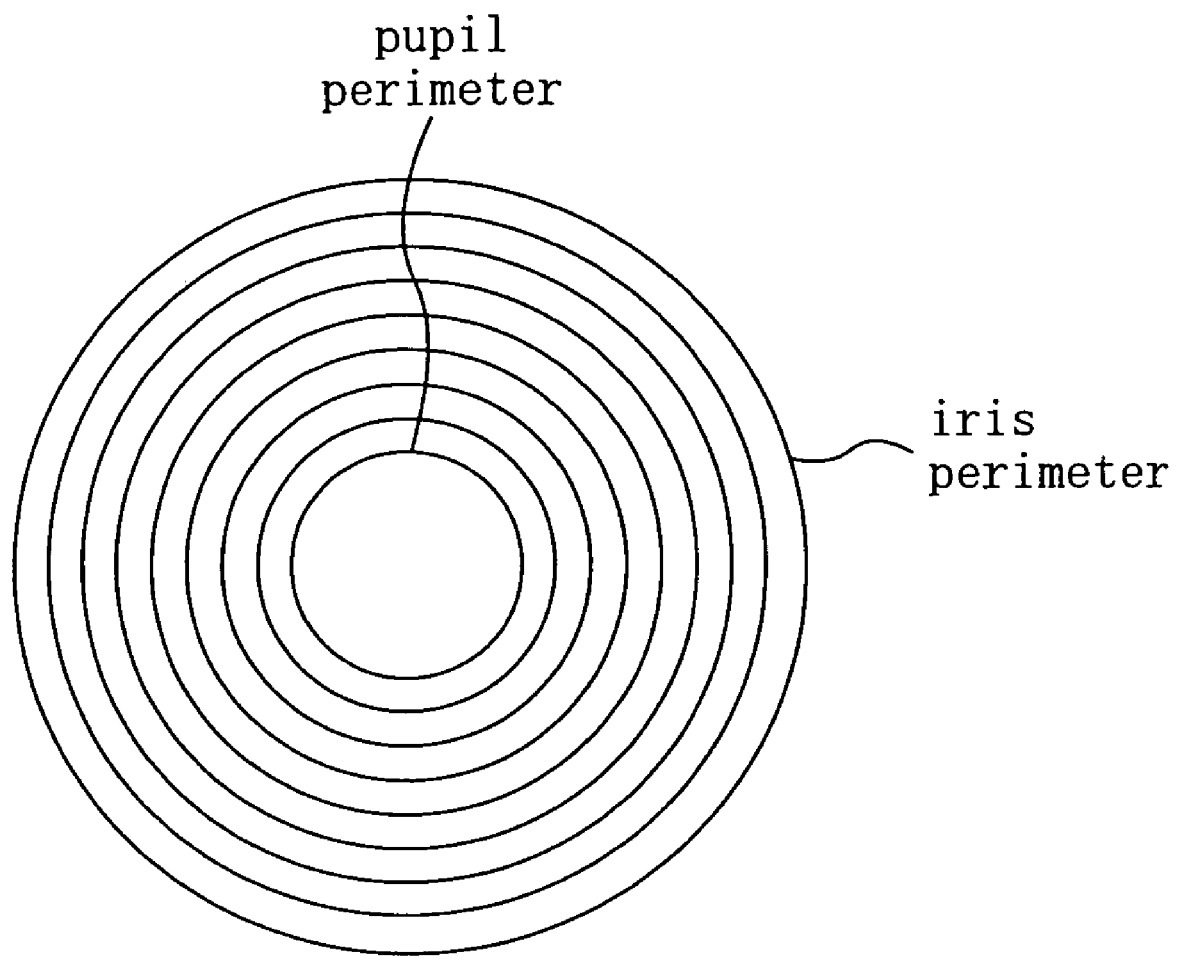
FIG. 7 shows analysis bands which are determined by concentrically dividing an iris into eight ring parts.

At this time, an analysis region is determined. Likewise in Patent Reference 1, the iris region is divided concentrically into eight ring parts as shown in FIG. 7.

Figure 8:
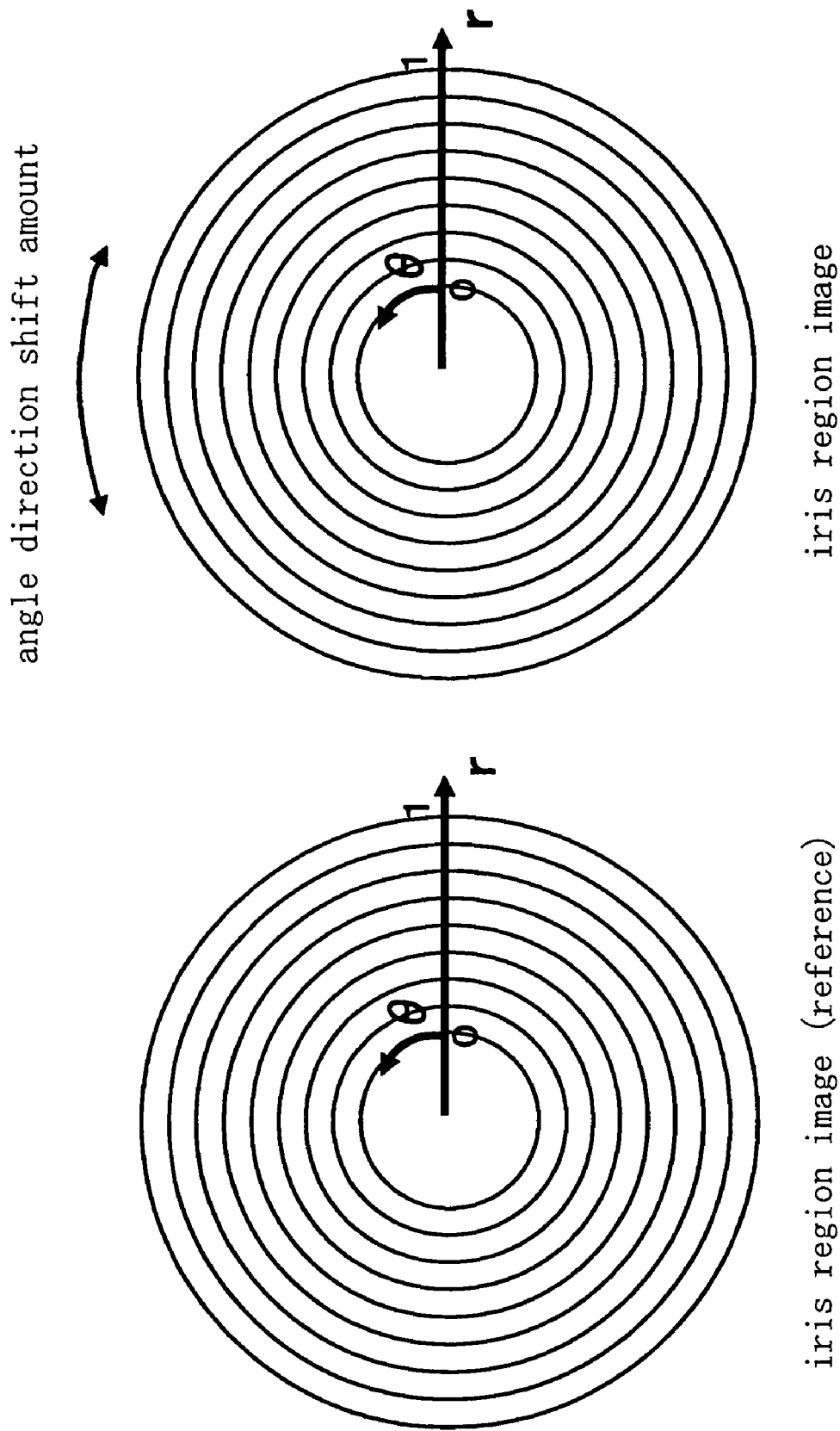
FIG. 8 shows a method for rotationally compensating an iris image.

Subsequently, rotational compensation is performed on each coordinate transformed iris image (S14). There is a possibility that displacement in angle direction is caused due to inclination of the face and rotation of the eyeball among the polar coordinate transformed iris images. Therefore, the displacement is compensated by the rotational compensation. Here, as shown in FIG. 8, matching of each iris image is performed with any one of the N iris images (e.g., the first iris image) as a reference, and a shift amount in the angle direction is determined so that a luminance residual (a sum of squared residuals or a sum of absolute values of residuals) from the reference iris image is a minimum, and then, the rotational compensation is performed. Wherein, only one ring part out of the eight ring parts of the iris region is referenced in FIG. 8 for the sake of simple explanation.

Next, while a weight is attached to each pixel value of each rotationally-compensated iris image, the rotational-compensated iris images are added together in each coordinate of the polar coordinate system to accumulate them as a single iris image (S15). The plural rotationally-compensated iris images are different from one another in captured position (pixel sampling position) to the iris pattern because of positional variation of the iris and the pupil accompanied by eye movement such as fixation jogging (phenomenon that an eyeball slightly moves even at one-point gaze), variation of the pupil diameter, time variation in relative position between the face and the camera and turning movement of the eyeball (involuntary movement around a visual axis). For this reason, when taking focus attention on a certain coordinate, the reliability is different among the pixel values in each iris images. Accordingly, accumulation of a plurality of iris images while performing the weighted addition in each coordinate ameliorates the spatial resolution, compared with the individual iris images.

It is noted that it has already been known that a resolution higher than individual signals can be obtained by synthesizing signals different in sampling position such as a pixel shifting method. However, mere addition and synthesis of a plurality of images cannot ameliorate the resolution of iris patterns because human pupils contract according to the peripheral condition such as brightness, and change in emotion and the like. In contrast, in the present embodiment, the weighted addition of the pixel values in each coordinate ameliorates the resolution of the iris patterns compared with individual iris images.

Hereinafter, the operation in an image accumulation step S15 will be described in detail.

In the polar coordinate transformation, a pixel position (x, y) corresponding to polar coordinates (r, θ) is usually not an integer. The difference between the corresponding pixel position (x, y) and the nearest pixel thereof (the coordinate value is an integer) becomes as follows:

$$\Delta x = [x]+1-x \text{ or } x-[x]$$

$$\Delta y = [y]+1-y \text{ or } y-[y] \quad (1)$$

Wherein, [ ] is a symbol for Gauss.

Each difference $\Delta x$ and $\Delta y$ falls within the range of ±0.5 from 0. The weighted addition according to the differences $\Delta x$, $\Delta y$ ameliorates the resolution of the iris images.

Figure 9:
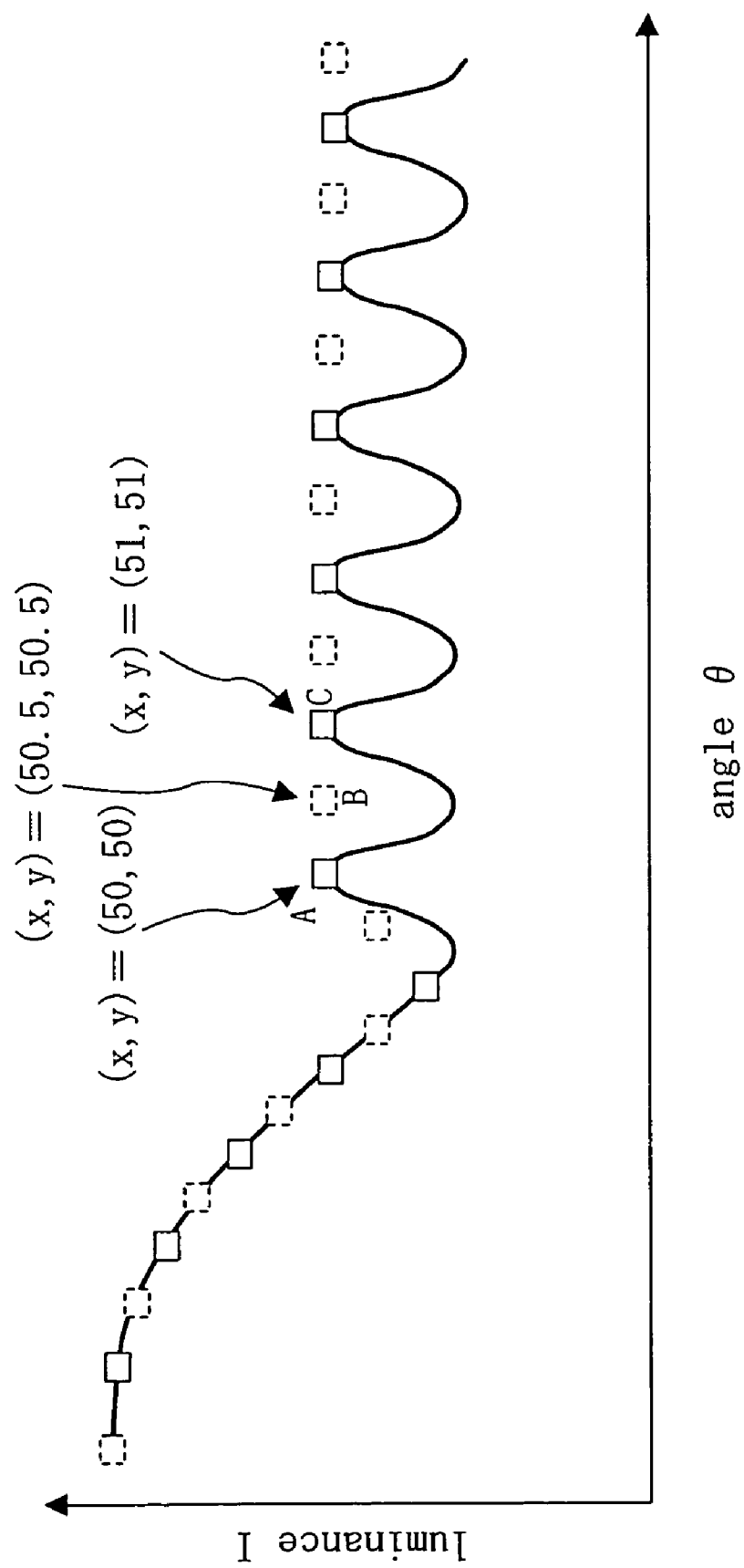
FIG. 9 is a graph illustrating a relationship between an actual luminance signal and a luminance value in coordinates of a polar coordinate system.

FIG. 9 is a graph illustrating the relationship between an actual luminance signal and a luminance value in the coordinates of the polar coordinate system. In FIG. 9, the solid line is one example of a luminance distribution in the circumferential direction of an iris image, and each data point (indicated as □) indicates a luminance value, which is obtained, by sampling, in each coordinate of the polar coordinate system. The axis of abscissa indicates an angle θ and the axis of ordinates indicates a luminance I. The sampling herein includes transformation from the rectangular coordinates (x, y) to the polar coordinates (r, θ). Accordingly, up-sampling to which interpolation is added is performed, instead of simple sampling.

In the graph of FIG. 9, a low-frequency signal is on the left side and a high-frequency signal is on the right side, for the sake of simplicity. Herein, the low-frequency signal means a signal of which wavelength is sufficiently longer (twice longer) than a sampling interval, and the high-frequency signal means a signal of which wavelength is approximately the same as or shorter than the sampling interval.

In the case where the size of a captured iris image is small, if the resolution is insufficient inside the inner periphery of the iris region, the frequency in the circumferential direction (frequency used for authentication) of the iris pattern could be equal to or higher than the Nyquist frequency for sampling in the (x, y) rectangular coordinates, as shown in FIG. 9. Herein, the waveform having a frequency twice as high as the Nyquist frequency is referred to for simplicity.

In FIG. 9, the original rectangular coordinate value (x, y) of a data point (e.g., A, C) indicated by the solid line is close to an integer (i.e., pixel position), while the original rectangular coordinate value (x, y) of a data point (e.g., B) indicated by the broken line is far from an integer and located in the middle of integers. The luminance value of the data point B is obtained by interpolating the luminance values of the data points A and C, and accordingly, is largely displaced from the actual luminance value.

Figure 10:
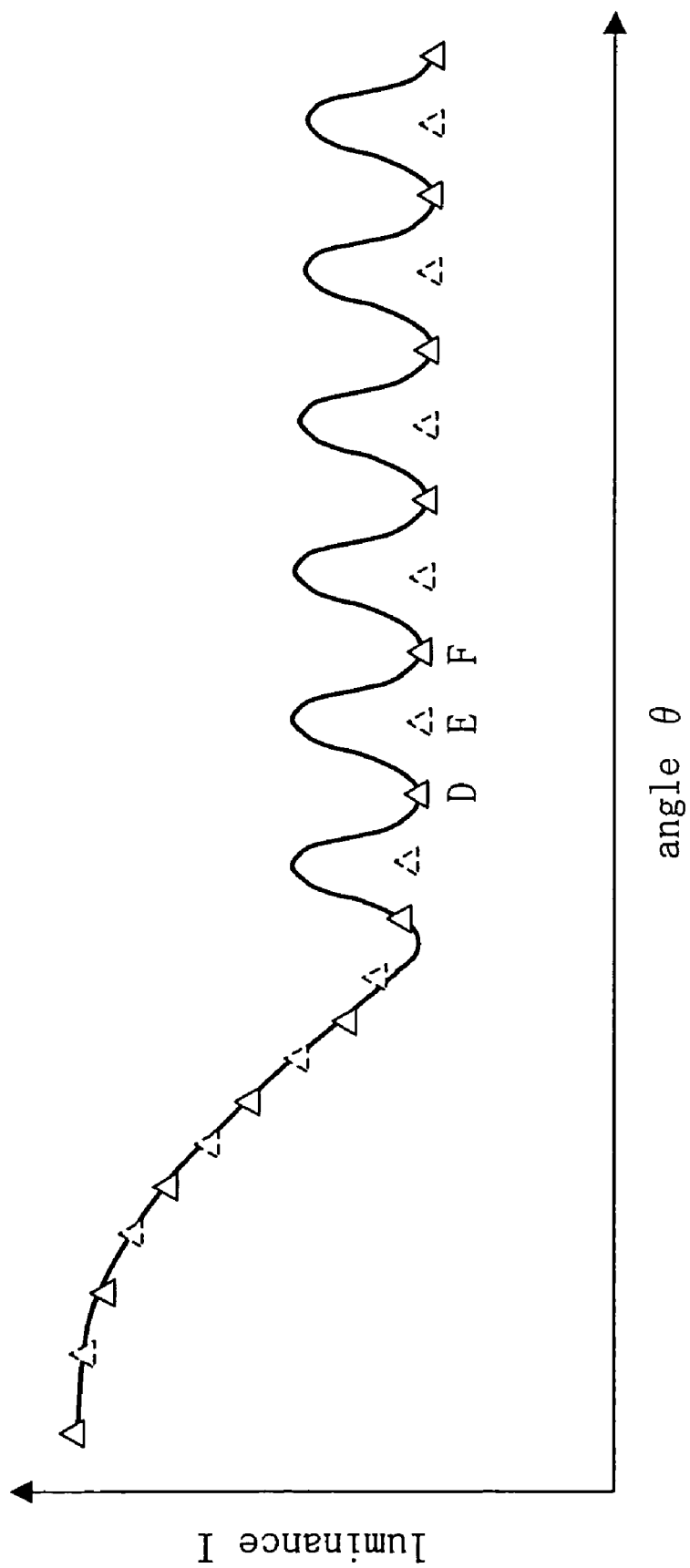
FIG. 10 is a graph illustrating a case where a sampled phase in FIG. 9 is shifted.

FIG. 10 shows the case where the luminance signals shown in FIG. 9 are phase-shifted and sampled. In FIG. 10, each data point (indicated as Δ) indicates a luminance value in each coordinate of the polar coordinate system obtained by sampling, wherein the original rectangular coordinate value (x, y) of a data point (e.g., D, F) indicated by the solid line is close to an integer (i.e., pixel position), while the original rectangular coordinate value (x, y) of a data point (e.g., E) indicated by the broken line is far from an integer and located in the middle of integers. The luminance value of the data point E is obtained by interpolating the luminance values of the data points D and F, and accordingly, is largely displaced from the actual luminance value.

Figure 11:
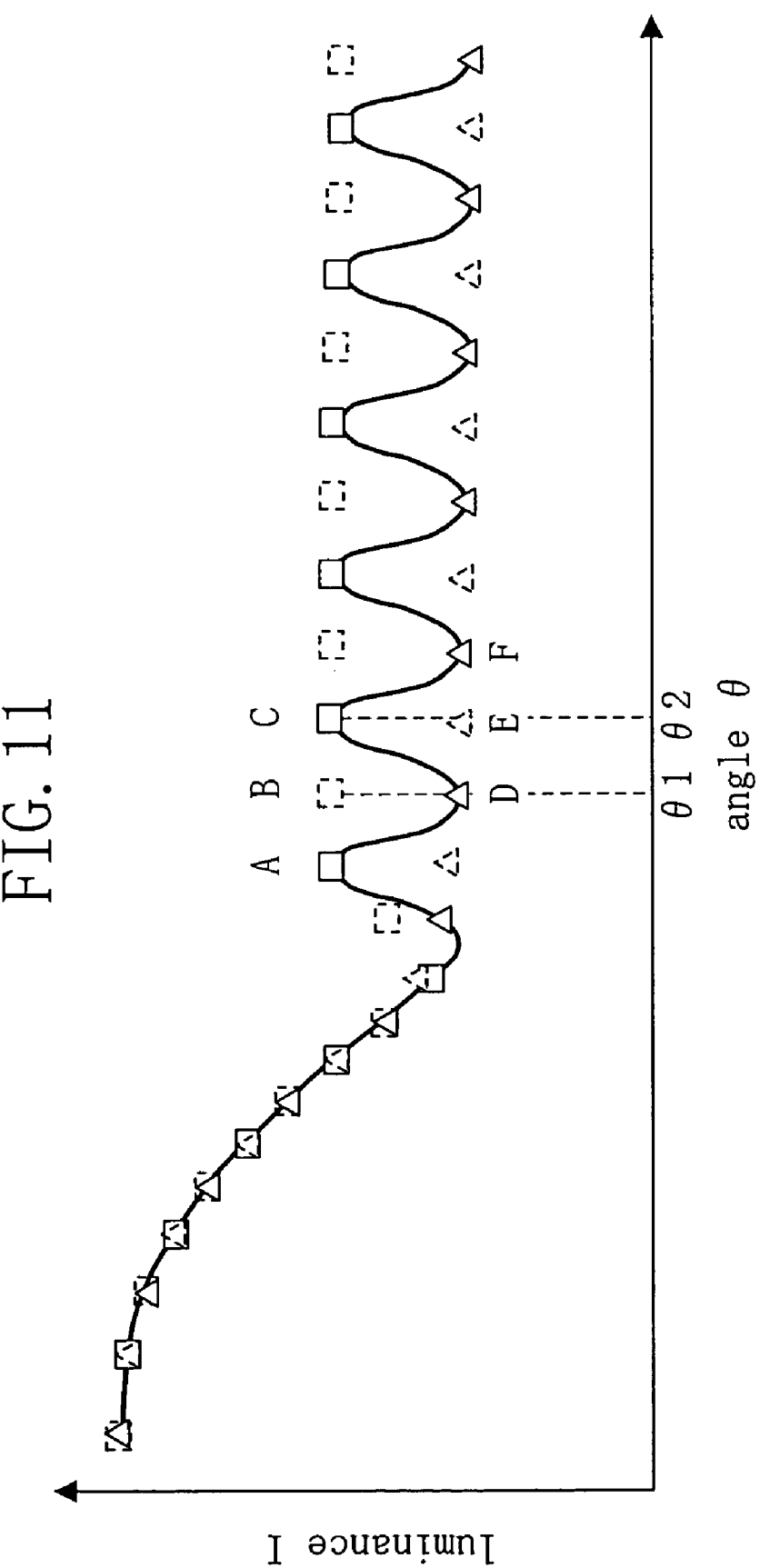
FIG. 11 is a graph indicating data points in FIG. 9 and FIG. 10 by overlaying the coordinates.

Suppose that data points shown in FIG. 9 are obtained from the first iris image and data points shown in FIG. 10 are obtained from the second iris image. FIG. 11 is a graph indicating data points in FIG. 9 and FIG. 10 by overlaying the coordinates. In FIG. 11, for example, the data B of the first iris image and the data D of the second iris image are obtained in a coordinate (angle) θ1, and the data C of the first iris image and the data E of the second iris image are obtained in a coordinate (angle) θ2.

Figure 12:
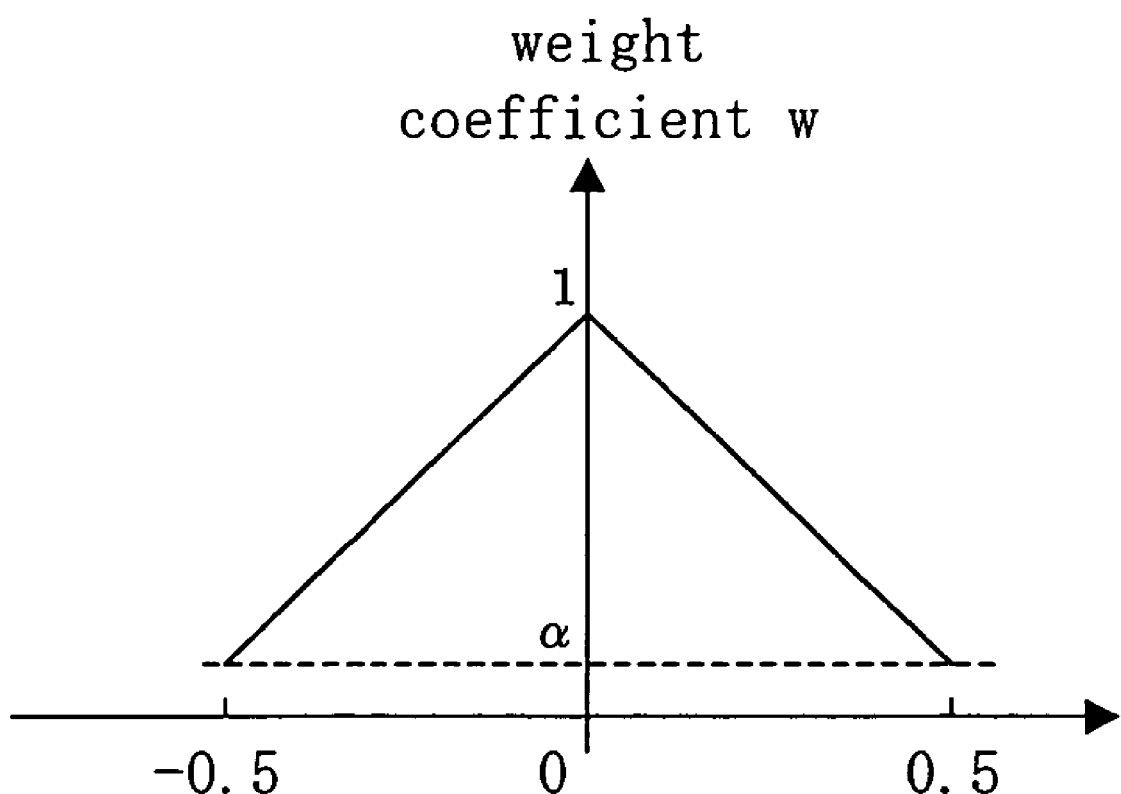
FIG. 12 illustrates a weight factor.

Here, a weight factor as illustrated in FIG. 12 is introduced. In FIG. 12, the axis of abscissas indicates the differences Δx, Δy respectively expressed in the aforementioned formulae (1), that is, a difference in coordinate value between the pixel position (x, y) corresponding to a polar coordinate (r, θ) and the nearest pixel of the pixel position (the coordinate value is an integer), and the axis of ordinates indicates the weight factor w. In FIG. 12, when the difference Δx or Δy is close to 0, namely, when the coordinate value of the rectangular coordinate system corresponding to the coordinate of the polar coordinate system is close to an integer, the weight factor w is set large. On the other hand, when the difference Δx or Δy is close to 0.5 or −0.5, namely, when the coordinate value of the rectangular coordinate system corresponding to the coordinate of the polar coordinate system is far from an integer, the weight factor w is set small. Wherein, α indicates a minimum value of the weight. For calculation stabilization of weighted addition (for avoiding division by 0), the minimum value a is preferably set not to be 0. In FIG. 12, the axis of abscissas indicates a single difference of a coordinate value for simplicity. However, it is preferable in practical use that each weight is calculated for both the difference Δx in the x coordinate value and the difference Δy in the y coordinate value, and then, a product (or sum) thereof is set as a final weight factor w. In other words, it is preferable to set the weight to be smaller as a distance between the coordinate value of the original rectangular coordinate system corresponding to the coordinate of the polar coordinate system and the coordinate value of the pixel near the coordinate value is larger. The weighted addition of the N iris images is performed by the following formula.

$$I(r, \theta) = \frac{\sum_{1}^{N} w_i(r, \theta) I_i(r, \theta)}{\sum_{1}^{N} w_i(r, \theta)}$$

Figure 13:
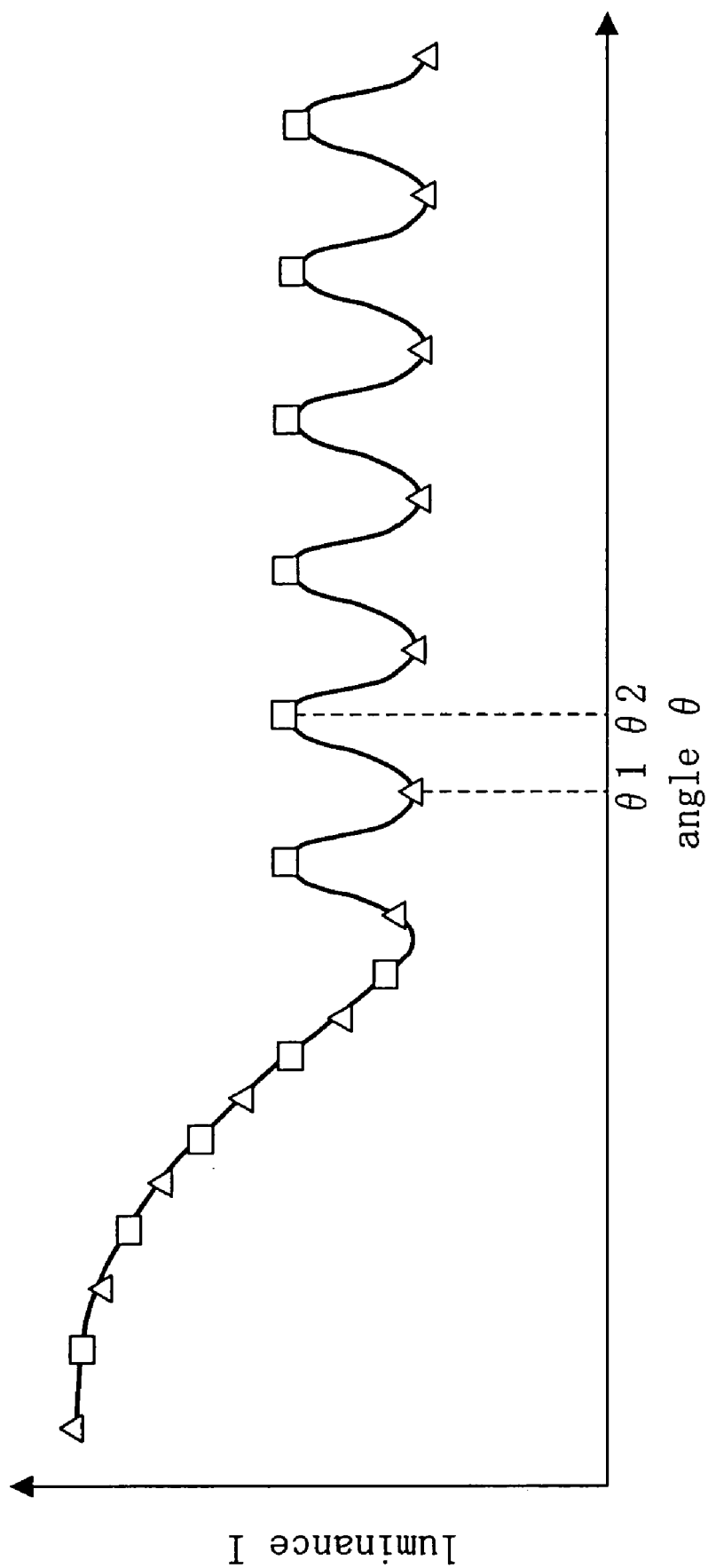
FIG. 13 is a graph illustrating the result of weighted addition of the data in FIG. 11 using the weight factor of FIG. 12.

The weighted addition of data indicated in FIG. 11 using the weight factor illustrated in FIG. 12 attains data (image)

shown in FIG. 13. In detail, α is added as the weight factor w to the data B of the first iris image and 1 is added as the weight factor w to the data C of the second iris image in the coordinate θ1, with a result that almost the same data as the data D of the second iris image is obtained. Similarly, almost the same data as the data C of the first iris image is obtained in the coordinate θ2. Accordingly, as shown in FIG. 13, a signal waveform of the solid line connecting the symbols □ and the symbols Δ is obtained, with a result that an iris pattern including a frequency component higher than the individual images can be reproduced.

It is noted that the above description refers to the case where the maximum peaks and the minimum peaks of the waveform are synthesized with the sample phase shifted by π. However, complete reproduction of a high-frequency waveform of the original iris pattern is not necessarily possible form only two images (two waveforms) because the phases of the waveforms and sampling position of the iris pattern change at random.

Figure 14:
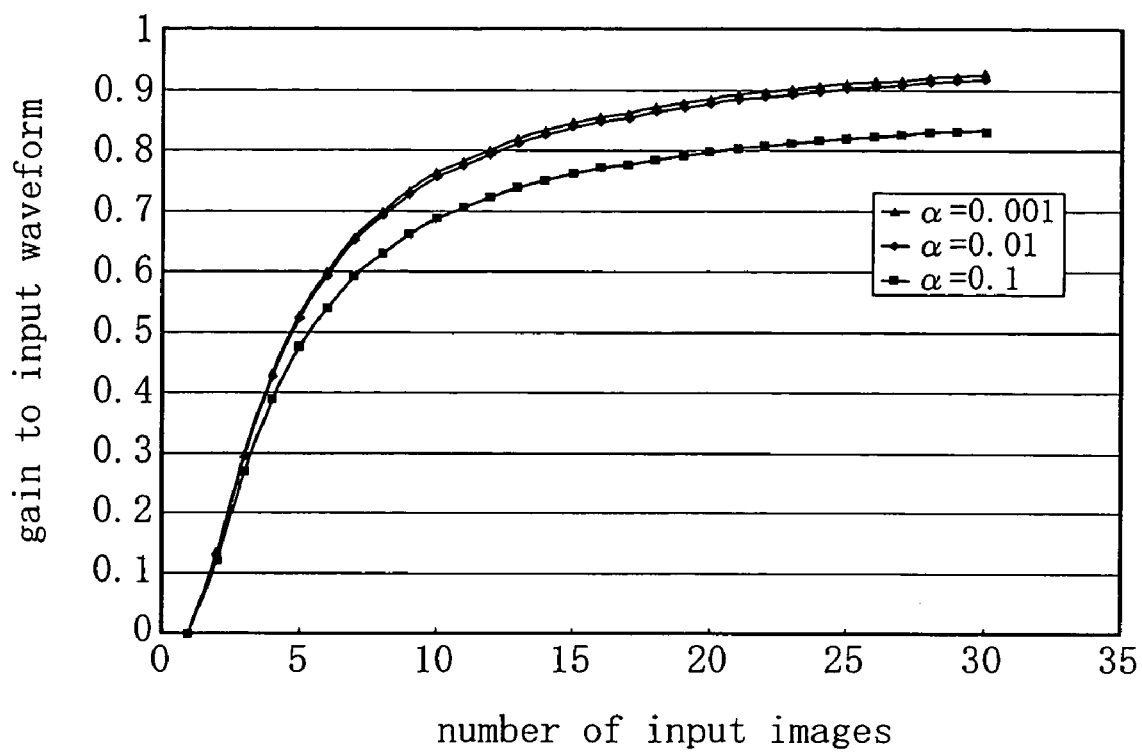
FIG. 14 is a graph illustrating a relationship between the number of images and a rate of reproduction to the original image.

FIG. 14 is a graph illustrating the relationship between the number of input images and a gain of a reproduced waveform (an amplitude ratio of a reproduced waveform to an input waveform). The data in FIG. 14 shows the case where a signal having a wavelength of a pixel interval is reproduced by weighted addition after up-sampling under the condition that the phases of the waveform and sampling position of an iris pattern are at random. As the gain is closer to "1", reproduction of higher frequency signal is attained.

It is understood, for example, from FIG. 14 that when the minimum value a of the weight factor w in FIG. 12 is set to be 0.01, about 50% reproduction of high-frequency waveform is attained from five input images and about 75% reproduction of high-frequency waveform is attained from ten input images. It is further understood that when the number of input images is equal to or larger than ten, the degree of resolution amelioration becomes gentler as the number of input images increases.

In an actual camera system, the gain around the Nyquist frequency is restricted by a low-pass filter (LPF) for preventing loop back around the Nyquist frequency. However, in the case where the resolution of an iris image is ameliorated by the image accumulation as described here, it is necessary to adjust the loop back component so as to be included in a video signal not by restricting the gain around the Nyquist frequency. To do so, it suffices to move the LPF characteristic (cutoff frequency) for preventing loop back toward the high frequency range. Further, it is preferable to set the aperture rate of the CCD of a camera to be about 50%. Because, at 100% aperture rate, the waveform of a frequency equal to the sampling frequency is integrated by the width of one pixel of the CCD and the output gain becomes 0, which is not preferable for resolution amelioration.

Figure 15:
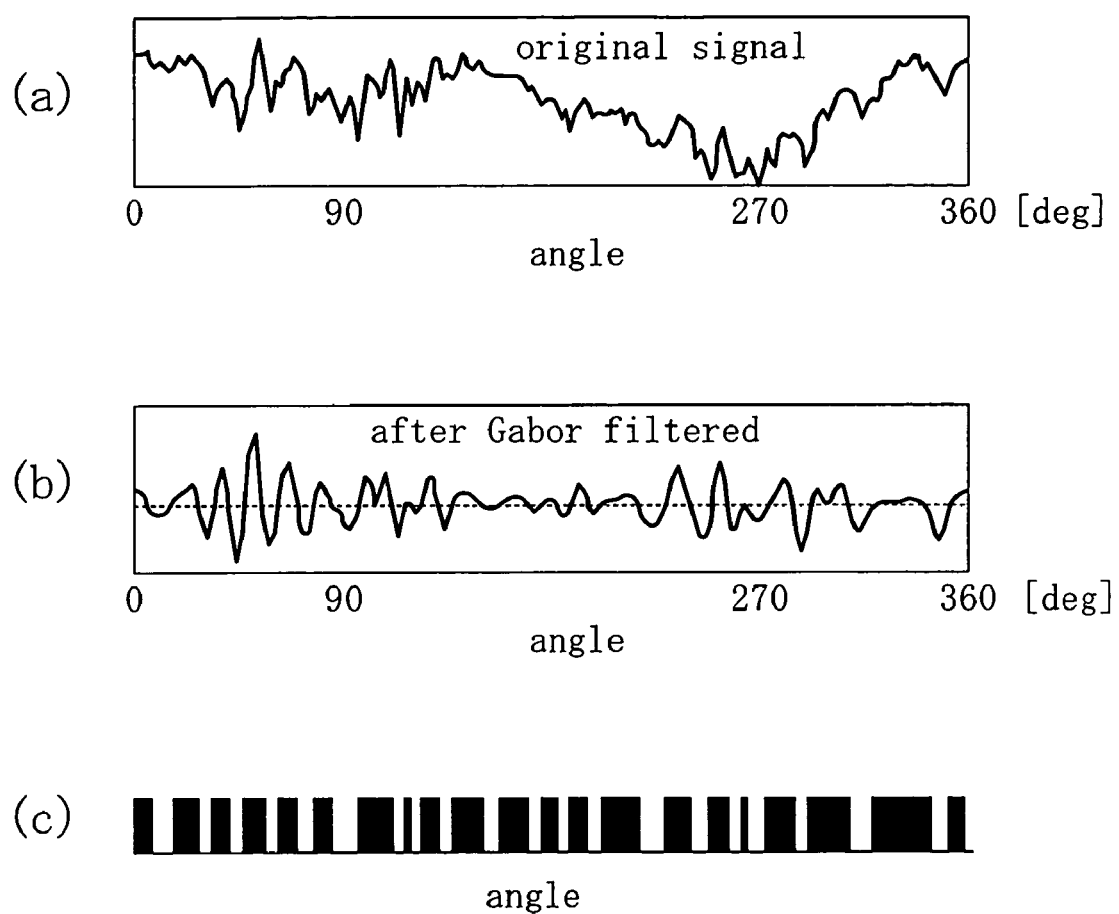
FIG. 15 shows a method for iris code generation.

After the image accumulation, feature extraction from the obtained single iris image is performed by Gabor transformation (S16), and an iris code of, for example, 2048 bits is generated as iris data, which is a feature amount for authentication (S17). FIG. 15 shows an iris code generation method and illustrates the processing in which Gabor transformation is applied (b) to an intensity signal (a) of an iris images in each analysis region obtained in the step S15 for binarization (c). Actually used signals are two-dimensional signals but a one-dimensional signal is indicated for the sake of simple description. (a) indicates an intensity signal in respective angles in one ring part out of the eight ring parts in FIG. 7. Actually, a real part and an imaginary part exist in a single-scale Gabor transformed output by applying multi-scale Gabor transformation. However, each of (b) and (c) is a result where a real part of a given single-scale Gabor transformed output is applied. Each bit position in the binarized iris code (c) corresponds to a position on the iris image.

Then, the thus generated iris code is compared with an iris code registered beforehand to perform authentication using a reference score (hamming distance: HD value) (S18). The person who is to be authenticated is authenticated as a registered person when the hamming distance is shorter than a predetermined threshold value TH1, and is rejected as another person otherwise. The final authentication result is displayed in the monitor 13 of the mobile phone 10 having the authentication function shown in FIG. 2.

As described above, according to the present embodiment, a plurality of iris images are subjected to the polar coordinate transformation, the rotational compensation and the weighted addition, and then, are accumulated, thereby ameliorating the resolution. In this association, even if a camera having low resolution is used, stable iris codes can be generated likewise in a high resolution camera. Thus, the occurrence of false rejection (FR) in iris authentication can be reduced.

Second Embodiment

Figure 16:
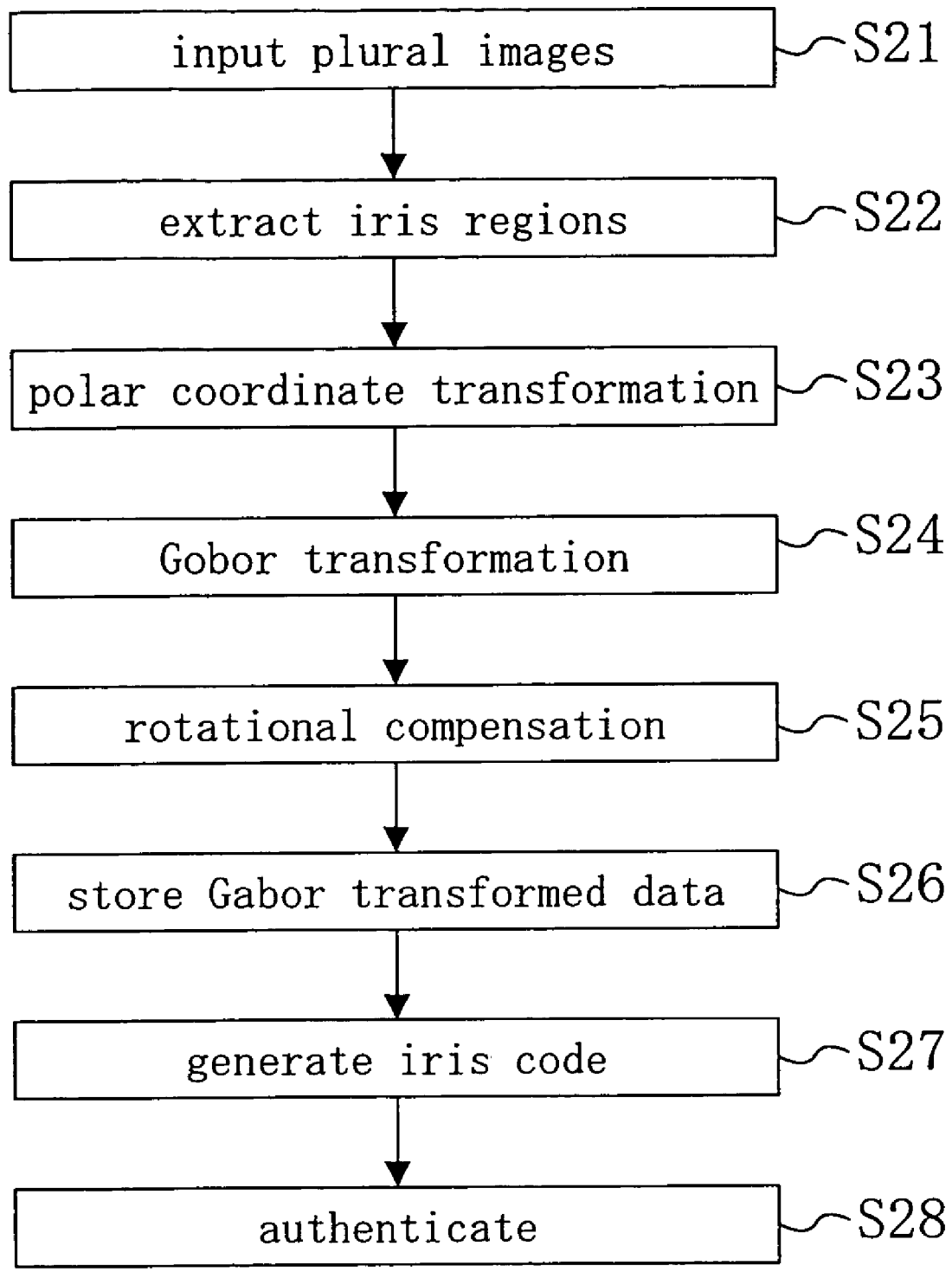
FIG. 16 is a flowchart illustrating an iris authentication method according to the second embodiment of the present invention.

FIG. 16 is a flowchart illustrating a personal authentication method using iris recognition according to the second embodiment of the present invention. In the present embodiment, a plurality of iris images after polar coordinate transformation (S21 through S23) are subjected to Gabor transformation for band limitation (S24), and the transformed data, that is, the band-limited images are subjected to rotational compensation (S25). Then, the weighted addition are performed to accumulate them (S26), and an iris code is generated (S27). In FIG. 16, the same processes as the steps S11 through S13, S17 and S18 in FIG. 1 are performed in steps S21 through S23, S27 and S28, respectively. The steps S21 through S27 constitute an iris code generation method.

In the step S25, the Gabor transformed data as the plural (N) images obtained in the step S24 is subjected to rotational compensation as shown in FIG. 17. In detail, a shift amount in the angle direction is determined so that a residual (a sum of squared residuals or a sum of absolute values of residuals) of Gabor transformed data from any one of the N iris images (e.g., the first Gabor transformed data) as a reference is a minimum, and then, the rotational compensation is performed. Wherein, only one ring part out of the eight ring parts of the iris region is referred to as a real part after a given-scale Gabor transformation, for the sake of simple explanation.

In the step S26, the plural Gabor transformed data after the rotational compensation in the step S25 are added together while attaching a weight to each data value in each coordinate of the polar coordinate system to accumulate them to obtain Gabor transformed data as a single image. The weighted addition herein is the same as that in the first embodiment. Namely, the weight attached to a data value of the Gabor transformed data of which coordinate value of the original rectangular coordinate value corresponding to the coordinate of the polar coordinate system is close to an integer is set large, while the weight attached to a data value of the Gabor transformed data of which coordinate value of the original rectangular coordinate value corresponding to the coordinate of the polar coordinate system is far from an integer is set small. Or, the weight is set smaller as a distance between the coordinate value of the original rectangular coordinate system and a coordinate value of a pixel near the coordinate value is longer. By this processing, the resolution of the iris pattern is remarkably ameliorated, similar to the first embodiment.

Thereafter, an iris code is generated from the single Gabor transformed data obtained in the step S26 (S27), and authentication is performed using the thus generated iris code (S28).

As described above, according to the present embodiment, Gabor transformed data of a plurality of iris images are subjected to the rotational compensation and the weighted addition, and then, are accumulated, thereby ameliorating the resolution. In this association, even if a camera having low resolution is used, stable iris codes can be generated likewise in a high resolution camera. Thus, the occurrence of false rejection (FR) in iris authentication can be reduced.

It is noted that the methods according to the first and second embodiments are applicable to not only authentication, namely the time when an iris code is generated for a non-registered person, but also iris code registration. For iris code registration, the above processing steps S11 through S17 or the above processing steps S21 through S27 are performed for a non-registered person and the thus generated iris code for registration is registered in the iris database.

Figure 18:
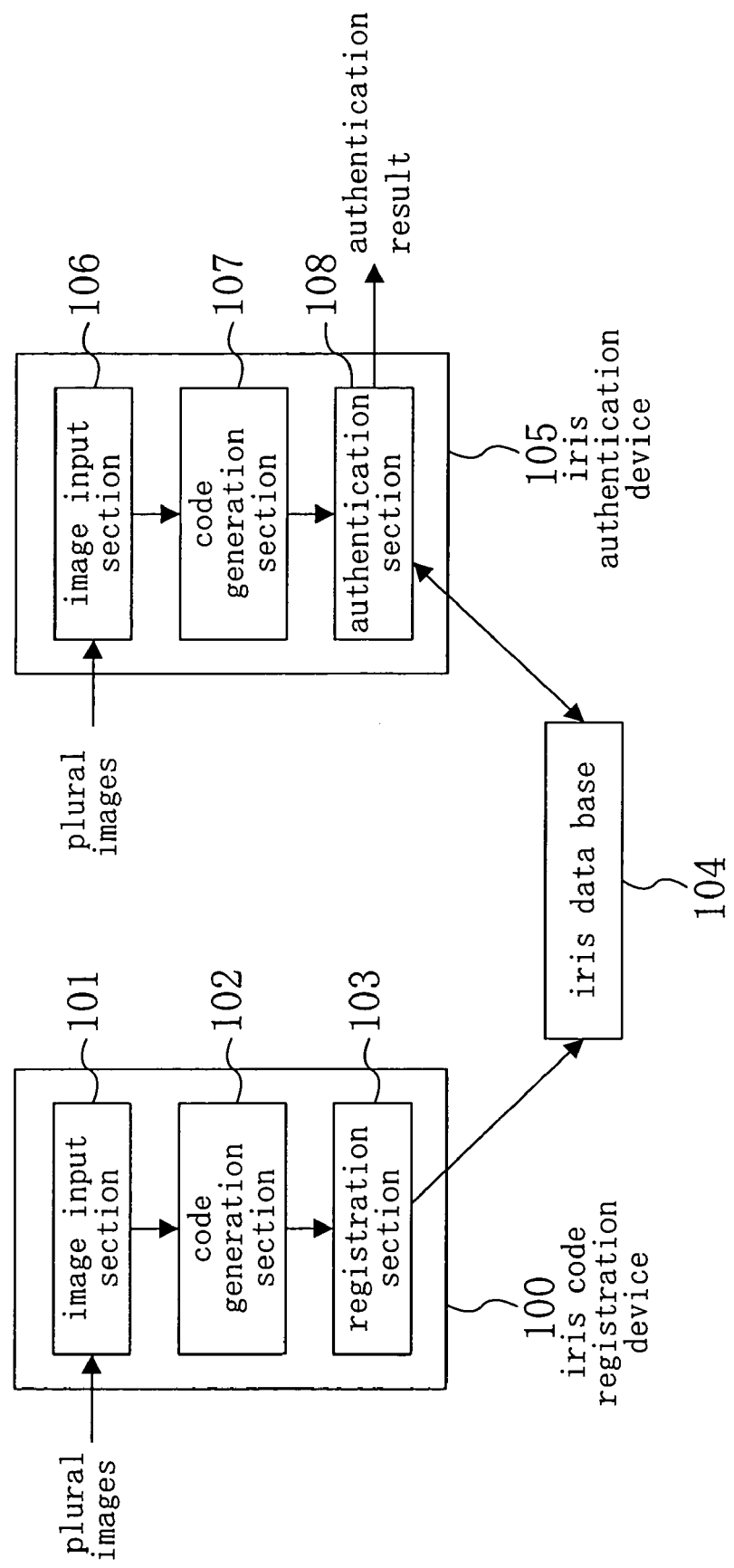
FIG. 18 conceptually shows structures of an iris code registration device and an iris authentication device according to each embodiment of the present invention.

FIG. 18 conceptually shows the structures of an iris code registration device and an iris authentication device according to each embodiment of the present invention. In FIG. 18, the iris code registration device 100 includes: an image input section 101; a code generation section 102 for generating an iris code from a plurality of images input through the image input section 101; and a registration section 103 for registering an iris code generated by the code generation section 102 to an iris database 104. On the other hand, the iris authentication device 105 includes: an image input section 106; a code generation section 107 for generating an iris code from a plurality of images input through the image input section 106; and an authentication section 108 for performing authentication by comparing an iris code generated by the code generation section 107 with an iris code registered in the iris database 104.

The code generation section 102 of the iris code registration device 100 carries out the iris code generation method in the first or second embodiment. Also, the code generation section 107 of the iris authentication device 105 carries out the iris code generation method in the first or second embodiment. Specifically, each code generation section 102, 107 includes, for example: an iris image obtaining section for performing the step S12 in FIG. 1; a transformation section for performing the step S13; a rotational compensation section for performing the step S14; an accumulation section for performing the step S15; and an iris code generation section for performing the steps S16, S17. Or, each code generation section 102, 107 includes: an iris image obtaining section for performing the step S22 in FIG. 16; a transformation section for performing the step S23; a band limitation section for performing the step S24; a rotational compensation section for performing the step S25; an accumulation section for performing the step S26; and an iris code generation section for performing the step S27.

Each code generation section 102, 107 is constituted by, for example, a computer and a program that allows the computer to execute the iris code generation method in the first or second embodiment. The present invention also includes a personal authentication program that allow a computer to execute the code generation step for generating an iris code by the iris code generation method in the first or second embodiment and an authentication step for performing authentication by comparing a generated iris code with an iris code registered in the iris database 104.

Wherein, the iris code generation method at the time of registration does not have to be necessarily the same as that at the time of authentication. For example, it is possible that an iris code for registration is generated from a single iris image using a high quality (high resolution) camera, which is expensive, according to the method described in Patent Reference 1 and an iris code for authentication is generated using a cheep and low resolution camera according to the method in the first or second embodiment, which is included in the present invention. Also, it is possible that the method in the first embodiment is employed for one of registration and authentication and the method in the second embodiment is employed for the other, which is included in the present invention.

Further, the number of input images is fixed in the above embodiments, but does not have to be necessarily fixed. For example, it is possible that an iris code is generated from a single iris image to perform authentication initially, and then, the processing as described in the above embodiments are performed using a plurality of iris images when the authentication results in rejection, namely, when the person is not authenticated as a registered person. In so doing, the occurrence of false rejection can be reduced with no unnecessary increase in calculation amount of authentication involved.

Figure 19:
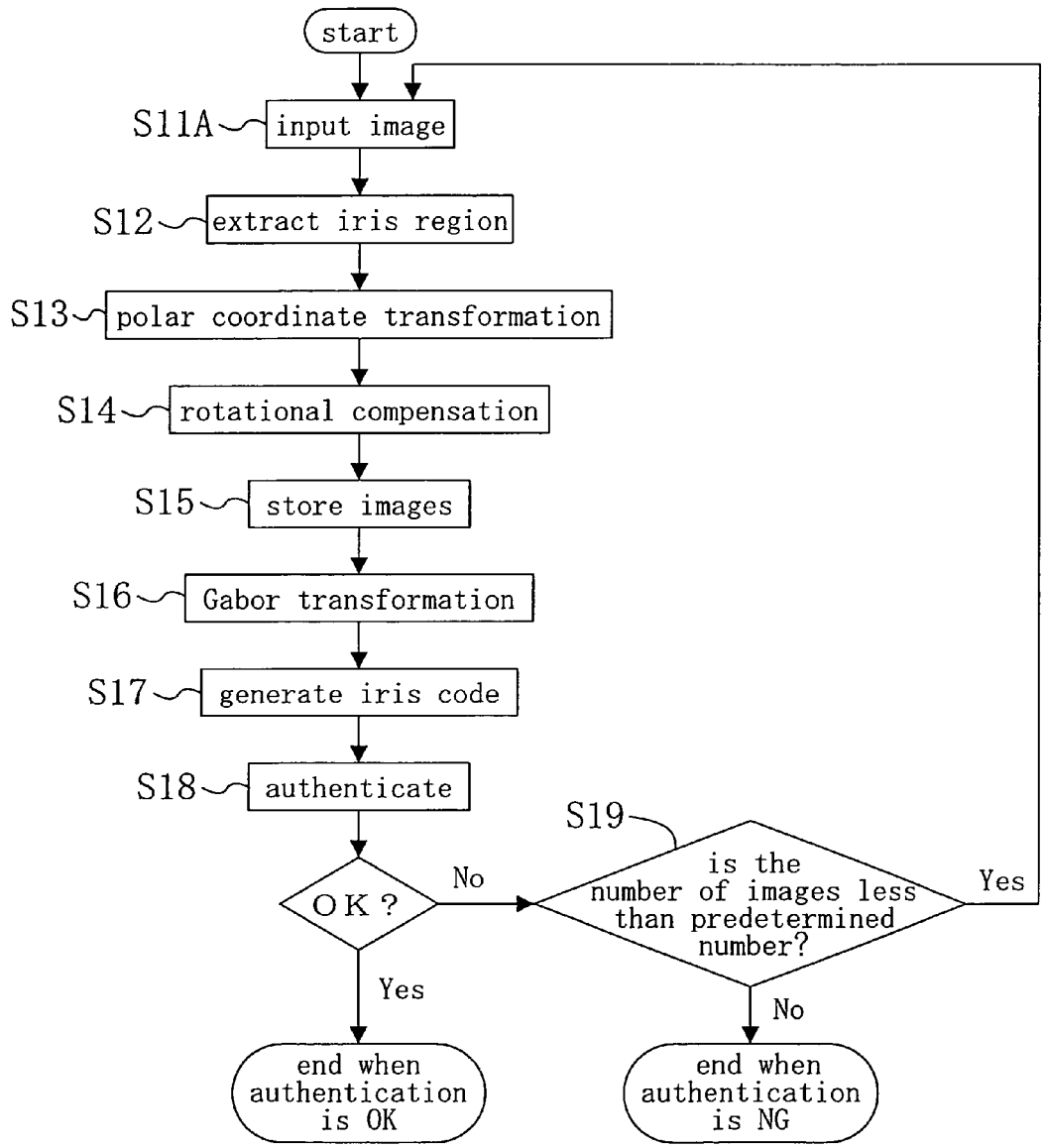
FIG. 19 is a flowchart illustrating a modified example of the iris authentication method according to each embodiment of the present invention.

FIG. 19 is a flowchart illustrating one example of the above processing, in which the method in the first embodiment is carried out repeatedly while increasing the number of iris images. In FIG. 19, the same reference numerals in FIG. 1 are assigned to the same steps in FIG. 1. First, one image that includes an eye is input in the step S11A, and the steps S12 through S18 are performed on the image. When the authentication results in OK, the processing terminates. When the image is not authenticated otherwise, the routine returns to the step S11A to input an additional image. After the steps S12 through S14 are performed on the added image, the weighting for the added image and the addition to the previous image are performed (S15) and an iris code is generated from the thus obtained single iris image for authentication (S16 through S18). When the authentication results still in rejection, the routine returns to the step S11A again and one more image is input to perform the same processes. The above processes are repeated until the authentication results in OK. If the authentication results in rejection (NO in S19) even after a predetermined images are input, the authentication results in NG to terminate the processing.

According to the above processing, the number of images required for authentication can be controlled to be a minimum, thereby reducing the calculation amount and enhancing user convenience. The method in the second embodiment may be carried out repeatedly while increasing the number of iris images, of course.

Figure 20:
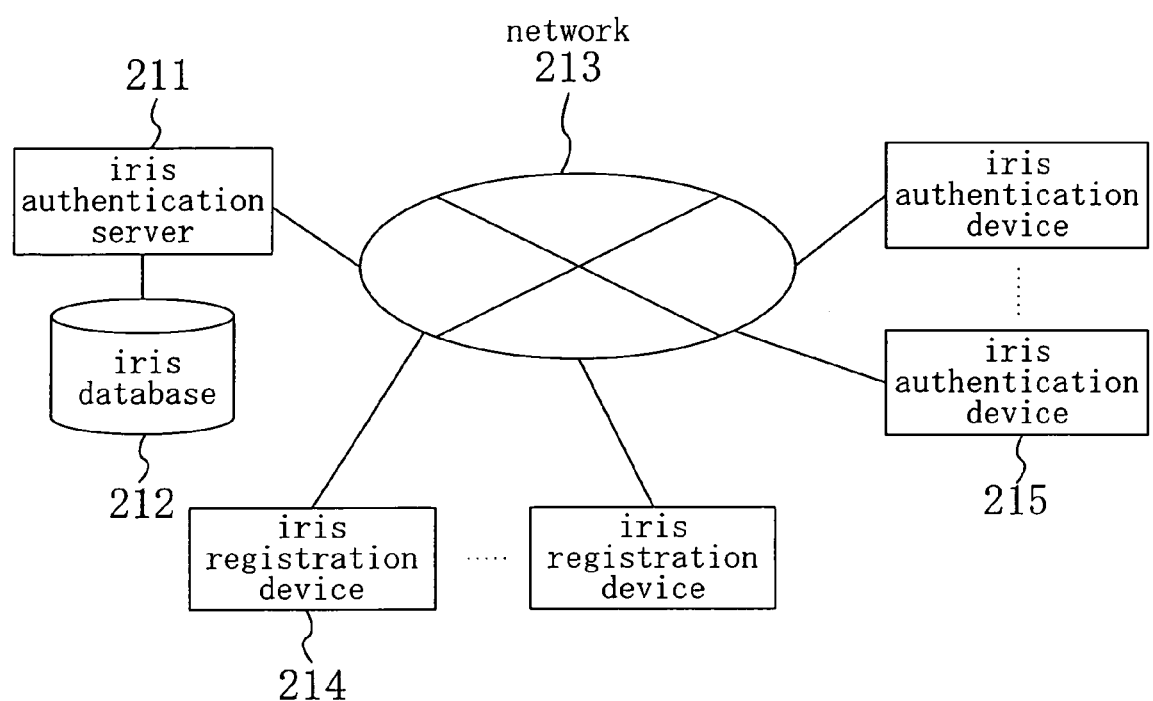
FIG. 20 illustrates one example of an iris authentication system that performs either of the embodiments of the present invention.

FIG. 20 illustrates one example of an iris authentication system that carries out the respective embodiments. In FIG. 20, an iris authentication server 211 includes an iris database 212 for storing iris codes of a plurality of persons and is connected to a network 213 such as Internet, an exclusive line and a public network. As well, iris registration devices 214 and iris authentication devices 215 are connected to the network 213 such as Internet, an exclusive line and a public network. The iris authentication sever is provided for managing the iris database 212.

Each iris registration device 214 sends an iris code generated at the time of registration to the iris database 212. Each iris authentication device 215 is reduced into practice by, for example, a mobile phone having an authentication function as shown in FIG. 2 and FIG. 3, and performs personal authentication by comparing an iris code generated at the time of authentication with an iris code at the time of registration obtained from the iris database 212.

It is noted that the iris authentication server 211 may be installed at plural places in each zone or each organization for use, or plural iris authentication severs 211 may be provided including a mirror server for load distribution. Further, the iris database 212 may be connected to the iris authentication server 211 via a network.

It is further noted that it is possible that each iris registration device 214 only performs capturing of an iris image for registration and sends the captured iris image to the iris authentication server 211 so that the iris authentication server 211 performs the iris code generation. Further, the iris authentication server 211 may have all the functions of the iris registration device 214.

The authentication processes are all performed on the terminal side in the first and second embodiments, but it is possible that each iris authentication device 215 only performs capturing of an iris image for authentication and sends a plurality of captured iris images to the iris authentication server 211 via the network 213 so that the iris authentication server 211 performs the iris code generation. It is also possible that the iris authentication server 211 also performs the comparison with the registered iris code and each iris authentication device 215 only receives the authentication results. It is still possible that each iris authentication device 215 itself performs iris code registration and/or storage of registered iris codes.

The first and second embodiments describe that the band limitation for feature extraction is performed by Gabor transformation, but the feature extraction method is not limited thereto and may be performed, for example, using another band-pass filter, which is included in the present invention.

INDUSTRIAL APPLICABILITY

According to the present invention, stable iris codes can be generated from iris images captured even with a low resolution camera, and therefore, the present invention is useful for reducing the occurrence of false rejection in iris authentication.

The invention claimed is:

1. An iris code generation method comprising the steps of:
a step of capturing a plurality of iris images that include a same eye;
a step of transforming a coordinate system of each of the iris images from a rectangular coordinate system to a polar coordinate system;
a step of performing rotational compensation on each of the coordinate transformed iris images;
a step of adding together each of the rotationally compensated iris images, while attaching a weight to each pixel value in each coordinate of the polar coordinate system, to accumulate them as a single iris image; and
a step of generating an iris code from the single iris image, wherein in the weighted addition in the accumulation step,
the weight is set smaller as a distance between a coordinate value in the original rectangular coordinate system corresponding to a coordinate of the polar coordinate system and a coordinate value of a pixel in the vicinity thereof is larger.

2. An iris code generation method comprising the steps of:
a step of capturing a plurality of iris images that include a same eye;
a step of transforming a coordinate system of each of the iris images from a rectangular coordinate system to a polar coordinate system;
a step of performing band limitation on each of the coordinate transformed iris images;
a step of performing rotational compensation on the band-limited iris images;
a step of adding together each of the rotationally compensated iris images, while attaching a weight to a data value in each coordinate of the polar coordinate system, to accumulate them as a single iris image; and
a step of generating an iris code from the single iris image, wherein in the weighted addition in the accumulation step,
the weight of a data value of which coordinate value of the original rectangular coordinate system corresponding to a coordinate of the polar coordinate system is close to an integer is set large, while the weight of a data value thereof is far from an integer is set small.

3. An iris code generation method comprising the steps of:
a step of capturing a plurality of iris images that include a same eye;
a step of transforming a coordinate system of each of the iris images from a rectangular coordinate system to a polar coordinate system;
a step of performing band limitation on each of the coordinate transformed iris images;
a step of performing rotational compensation on the band-limited iris images;
a step of adding together each of the rotationally compensated iris images, while attaching a weight to each data value in each coordinate of the polar coordinate system, to accumulate them as a single iris image; and
a step of generating an iris code from the single iris image, wherein in the weighted addition in the accumulation step,
the weight is set smaller as a distance between a coordinate value of the original rectangular coordinate system corresponding to a coordinate of the polar coordinate system and a coordinate value of a pixel in the vicinity thereof is larger.

4. The iris code generation method of claim 2 or 3, wherein the band limitation is performed by Gabor transformation.

5. A personal authentication method comprising the steps of:
a first step of performing authentication by generating an iris code from a single iris image captured for a person who is to be authenticated; and
a second step of performing, when the authentication in the first step results in rejection, authentication by generating an iris code from a plurality of iris images captured for the person who is to be authenticated by the iris code generation method of claim 1.

6. A personal authentication method using an iris image, comprising the steps of:
at a time of registration,
generating an iris code from an iris image; and
registering the generated iris code in a database,
at a time of authentication,
generating an iris code from an iris image; and performing authentication by comparing the thus generated iris code with the iris code registered in the database, wherein at one or more of the time of registration and the time of authentication, iris code generation is performed by the iris code generation method of claim 1.

7. An iris code registration device comprising:

a code generation section that generates an iris code by the iris code generation method of claim 1; and a registration section that registers in a database an iris code generated by the code generation section.

8. A personal authentication device, comprising:

a code generation section that generates an iris code by the iris code generation method of claim 1; and an authentication section that performs authentication by comparing an iris code generated by the code generation section with a registered iris code.

9. A personal authentication program encoded on a computer readable medium to execute the steps of:

a code generation step of generating an iris code by the iris code generation method of claim 1: and an authentication step of performing authentication by comparing the iris code with an iris code registered in a database.

10. A personal authentication method comprising the steps of:

a first step of performing authentication by generating an iris code from a single iris image captured for a person who is to be authenticated; and a second step of performing, when the authentication in the first step results in rejection, authentication by generating an iris code from a plurality of iris images captured for the person who is to be authenticated by the iris code generation method of claim 2.

11. A personal authentication method using an iris image, comprising the steps of:

at a time of registration, generating an iris code from an iris image; and registering the generated iris code in a database, at a time of authentication, generating an iris code from an iris image; and performing authentication by comparing the thus generated iris code with the iris code registered in the database, wherein at one or more of the time of registration and the time of authentication, iris code generation is performed by the iris code generation method of claim 2.

12. An iris code registration device comprising:

a code generation section that generates an iris code by the iris code generation method of claim 2; and a registration section that registers in a database an iris code generated by the code generation section.

13. A personal authentication device, comprising:

a code generation section that generates an iris code by the iris code generation method of claim 2; and an authentication section that performs authentication by comparing an iris code generated by the code generation section with a registered iris code.

14. A personal authentication program encoded on a computer readable medium to execute the steps of:

a code generation step of generating an iris code by the iris code generation method of claim 2: and an authentication step of performing authentication by comparing the iris code with an iris code registered in a database.

15. A personal authentication method comprising the steps of:

a first step of performing authentication by generating an iris code from a single iris image captured for a person who is to be authenticated; and a second step of performing, when the authentication in the first step results in rejection, authentication by generating an iris code from a plurality of iris images captured for the person who is to be authenticated by the iris code generation method of claim 3.

16. A personal authentication method using an iris image, comprising the steps of:

at a time of registration, generating an iris code from an iris image; and registering the generated iris code in a database, at a time of authentication, generating an iris code from an iris image; and performing authentication by comparing the thus generated iris code with the iris code registered in the database, wherein at one or more of the time of registration and the time of authentication iris code generation is performed by the iris code generation method of claim 3.

17. An iris code registration device comprising:

a code generation section that generates an iris code by the iris code generation method of claim 3; and a registration section that registers in a database an iris code generated by the code generation section.

18. A personal authentication device, comprising:

a code generation section that generates an iris code by the iris code generation method of claim 3; and an authentication section that performs authentication by comparing an iris code generated by the code generation section with a registered iris code.

19. A personal authentication program encoded on a computer readable medium to execute the steps of:

a code generation step of generating an iris code by the iris code generation method of claim 3: and an authentication step of performing authentication by comparing the iris code with an iris code registered in a database.

20. A personal authentication method comprising the steps of:

a first step of performing authentication by generating an iris code from a single iris image captured for a person who is to be authenticated; and a second step of performing, when the authentication in the first step results in rejection, authentication by generating an iris code from a plurality of iris images captured for the person who is to be authenticated by the iris code generation method of claim 4.

21. A personal authentication method using an iris image, comprising the steps of:

at a time of registration, generating an iris code from an iris image; and registering the generated iris code in a database, at a time of authentication, generating an iris code from an iris image; and performing authentication by comparing the thus generated iris code with the iris code registered in the database, wherein at one or more of the time of registration and the time of authentication, iris code generation is performed by the iris code generation method of claim 4.

22. An iris code registration device comprising:

a code generation section that generates an iris code by the iris code generation method of claim 4; and a registration section that registers in a database an iris code generated by the code generation section.

23. A personal authentication device, comprising:
a code generation section that generates an iris code by the iris code generation method of claim 4; and
an authentication section that performs authentication by comparing an iris code generated by the code generation section with a registered iris code.

24. A personal authentication program encoded on a computer readable medium to execute the steps of:
a code generation step of generating an iris code by the iris code generation method of claim 4: and
an authentication step of performing authentication by comparing the iris code with an iris code registered in a database.

* * * * *

UNITED STATES PATENT AND TRADEMARK OFFICE
CERTIFICATE OF CORRECTION

| | |
|---|---|
| PATENT NO. | : 7,379,567 B2 |
| APPLICATION NO. | : 10/544803 |
| DATED | : May 27, 2008 |
| INVENTOR(S) | : Azuma et al. |

It is certified that error appears in the above-identified patent and that said Letters Patent is hereby corrected as shown below:

In Claim 9, Col. 15, Line 21, "claim 1: and" should be -- claim 1; and --

Signed and Sealed this

Seventh Day of October, 2008

JON W. DUDAS
*Director of the United States Patent and Trademark Office*